United States Patent
Ajgaonkar

(10) Patent No.: US 12,412,107 B2
(45) Date of Patent: Sep. 9, 2025

(54) BLOCKCHAIN RECORDATION AND VALIDATION OF VIDEO DATA

(71) Applicant: Insight Direct USA, Inc., Tempe, AZ (US)

(72) Inventor: Amol Ajgaonkar, Chandler, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 672 days.

(21) Appl. No.: 17/679,807

(22) Filed: Feb. 24, 2022

(65) Prior Publication Data

US 2023/0206634 A1 Jun. 29, 2023

Related U.S. Application Data

(60) Provisional application No. 63/294,554, filed on Dec. 29, 2021.

(51) Int. Cl.
*G06N 5/04* (2023.01)
*G06F 16/78* (2019.01)
(Continued)

(52) U.S. Cl.
CPC ........... *G06N 5/04* (2013.01); *G06F 16/7867* (2019.01); *G06N 20/00* (2019.01); *G06V 20/41* (2022.01); *G06V 20/46* (2022.01); *G06F 16/783* (2019.01)

(58) Field of Classification Search
CPC . G06T 5/30; G06T 7/194; G06T 2207/20084; G06T 2207/20212;
(Continued)

(56) References Cited

U.S. PATENT DOCUMENTS 6,757,434 B2   6/2004   Miled et al.
7,636,097 B1   12/2009  Holloway
(Continued)

FOREIGN PATENT DOCUMENTS

EP   3719687 A1    10/2020
WO   2020022956 A1  1/2020
(Continued)

*Primary Examiner* — Benjamin R Bruckart
*Assistant Examiner* — Franklin S Andramuno
(74) *Attorney, Agent, or Firm* — Kinney & Lange, P.A.

(57) ABSTRACT

A method of committing video data and associated metadata to a blockchain ledger includes preprocessing the video data, by a first computer processor, according to preprocessing parameters defined within a runtime configuration file, wherein the video data is preprocessed to edit the video data to be suitable for use by a first artificial intelligence model. The method also includes accessing the preprocessed video data and associated metadata by the first artificial intelligence model with the first artificial intelligence model being configured to determine a first output that is indicative of a first inference dependent upon the preprocessed video data, formulating first annotated video data and associated metadata by the first artificial intelligence model that includes the first output indicative of the first inference, and accessing the preprocessed video data and associated metadata by a blockchain subscriber independent from the first artificial intelligence model. In response to a determination by the first artificial intelligence model that the first inference has occurred so as to prompt the formulation of the first output, the method includes committing a first entry to the blockchain ledger that includes the first annotated video data, metadata associated with the first annotated video data, the preprocessed video data, and metadata associated with the preprocessed video data.

20 Claims, 7 Drawing Sheets

(51) Int. Cl.
*G06N 20/00* (2019.01)
*G06V 20/40* (2022.01)
*G06F 16/783* (2019.01)

(58) Field of Classification Search
CPC ...... G06N 5/04; G06N 20/00; G06F 16/7867; G06F 16/783; G06V 20/46; G06V 20/41
See application file for complete search history.

(56) References Cited

U.S. PATENT DOCUMENTS

| | | | |
|---|---|---|---|
| 8,358,319 | B2 | 1/2013 | Côté et al. |
| 8,493,482 | B2 | 7/2013 | Côté et al. |
| 8,577,279 | B2 | 11/2013 | Baker et al. |
| 8,593,483 | B2 | 11/2013 | Côté et al. |
| 8,786,625 | B2 | 7/2014 | Côté et al. |
| 9,100,588 | B1 | 8/2015 | Seymour |
| 9,871,998 | B1 | 1/2018 | Curlander et al. |
| 10,057,636 | B1 | 8/2018 | Nijim et al. |
| 10,114,980 | B2 | 10/2018 | Barinov et al. |
| 10,122,906 | B2 | 11/2018 | Yang et al. |
| 10,176,309 | B2 | 1/2019 | Tormasov et al. |
| 10,380,431 | B2 | 8/2019 | Winter et al. |
| 10,497,136 | B2 | 12/2019 | Tamaazousti et al. |
| 10,687,022 | B2 | 6/2020 | Rasheed et al. |
| 10,756,912 | B2 | 8/2020 | Balasaygun et al. |
| 10,860,860 | B1 * | 12/2020 | Huynh ................ G06F 16/739 |
| 10,958,854 | B2 | 3/2021 | Elboher |
| 11,038,884 | B2 | 6/2021 | Li |
| 11,044,525 | B2 | 6/2021 | Armaly |
| 11,050,551 | B2 | 6/2021 | Maggu et al. |
| 11,075,744 | B2 | 7/2021 | Tormasov et al. |
| 11,120,013 | B2 | 9/2021 | Bates et al. |
| 11,138,345 | B2 | 10/2021 | Zou et al. |
| 11,153,069 | B2 | 10/2021 | Kurian |
| 11,594,032 | B1 * | 2/2023 | Raman ............... H04N 21/8352 |
| 12,118,916 | B2 * | 10/2024 | Yang ................ H04N 21/42203 |
| 2006/0277256 | A1 | 12/2006 | Tiruthani et al. |
| 2006/0287081 | A1 | 12/2006 | Osawa |
| 2007/0013801 | A1 | 1/2007 | Sezan et al. |
| 2007/0189708 | A1 | 8/2007 | Lerman et al. |
| 2009/0033745 | A1 | 2/2009 | Yeredor et al. |
| 2010/0104027 | A1 | 4/2010 | Youn et al. |
| 2010/0131554 | A1 | 5/2010 | Cooper |
| 2010/0198947 | A1 | 8/2010 | Daughtery et al. |
| 2011/0041080 | A1 | 2/2011 | Fleischman et al. |
| 2012/0044945 | A1 | 2/2012 | Bhayani |
| 2012/0075435 | A1 | 3/2012 | Hovanky et al. |
| 2012/0154666 | A1 | 6/2012 | Ohashi |
| 2013/0038737 | A1 | 2/2013 | Yehezkel et al. |
| 2013/0216207 | A1 | 8/2013 | Berry et al. |
| 2014/0362231 | A1 | 12/2014 | Bietsch et al. |
| 2015/0026718 | A1 * | 1/2015 | Seyller ................ H04N 21/854 725/34 |
| 2017/0134162 | A1 | 5/2017 | Code et al. |
| 2017/0308403 | A1 | 10/2017 | Turull et al. |
| 2018/0167698 | A1 | 6/2018 | Mercer et al. |
| 2018/0268864 | A1 | 9/2018 | Bovik et al. |
| 2018/0330169 | A1 | 11/2018 | Van Hoof et al. |
| 2020/0007958 | A1 | 1/2020 | Wondra et al. |
| 2020/0195693 | A1 | 6/2020 | Price et al. |
| 2020/0336710 | A1 | 10/2020 | Zhang |
| 2021/0124760 | A1 | 4/2021 | Klein et al. |
| 2021/0195268 | A1 | 6/2021 | Jiang et al. |
| 2021/0233204 | A1 | 7/2021 | Alattar et al. |
| 2021/0314396 | A1 | 10/2021 | Basu et al. |
| 2021/0321064 | A1 | 10/2021 | Broaddus |
| 2022/0044334 | A1 * | 2/2022 | Blaikie, III ........ G06Q 30/0204 |
| 2022/0276940 | A1 * | 9/2022 | Wald .................... G06F 11/0751 |
| 2022/0329539 | A1 * | 10/2022 | Kim .................... H04L 41/147 |
| 2022/0368972 | A1 | 11/2022 | Cheraghi et al. |
| 2023/0056885 | A1 * | 2/2023 | Mamadapur ........ G06F 21/6218 |

FOREIGN PATENT DOCUMENTS

| | | |
|---|---|---|
| WO | 2021053604 A1 | 3/2021 |
| WO | 2021135641 A1 | 7/2021 |
| WO | 2021208952 A1 | 10/2021 |

* cited by examiner

BLOCKCHAIN RECORDATION AND VALIDATION OF VIDEO DATA

PRIORITY CLAIM

The present application claims the benefit of U.S. Provisional Patent Application Ser. No. 63/294,554 filed Dec. 29, 2021, which is incorporated herein by reference in its entirety.

BACKGROUND

This disclosure relates generally to validating the authenticity of video data and, more specifically, to the use of a blockchain/distributed ledger to record and validate the video data to prevent modification and/or manipulation of the data.

Cameras are beneficial for use in many areas of commercial and personal practice. For example, security cameras are used within (and outside) commercial warehouses and on private personal property. Other applications use cameras along assembly lines for quality control purposes. With the increased capabilities of cameras having higher quality imagery (i.e., resolution) and a wider field of view, more area can be shown in the streaming video by the camera. A large portion of the frame/field of view may be of little or no interest to the consumer (e.g., a security or manufacturing company). However, current practices relay the entirety of the streaming video (i.e., the entire frame/field of view) to the consumer, which can be time and resource consuming due to the need to transfer large frame (i.e., field of view), high resolution video data.

SUMMARY

A system and method for selection/extraction, preprocessing, and publishing of video data of a region of interest (i.e., a scene) that is a subset of a field of view of streaming video is disclosed herein. The system and method can also include processing the video data by a consumer/subscriber after the video data has been published.

Streaming video data is received from a camera with a first field of view. The video data is then preprocessed, by a computer processor such as a gateway or digital container, according to preprocessing parameters defined within a runtime configuration file that is pushed down to the computer processor. The runtime configuration file can be stored and/or edited distant from the computer processor, and any edits/revisions to the runtime configuration file can be pushed to and applied by the computer processor to the streaming video data in real time to alter the preprocessing applied to the video data. The preprocessing can include formatting/cropping the streaming video data received from the camera so as to be first video data of a first region of interest (i.e., a scene) having a second field of view that is less than (shows less area than) the first field of view shown by the entirety of the streaming video data from the camera. The preprocessing as defined by the preprocessing parameters in the runtime configuration file can also include altering the first video data's grayscale, contrast, brightness, color threshold, size, blur, hue saturation value (HSV), sharpen, erosion, dilation, Laplacian image processing, Sobel image processing, pyramid up, and pyramid down (among others). The first video data can then be published to an endpoint (such as a topic on an asynchronous messaging library like ZeroMQ) for subscription and use by a first subscriber/consumer.

The first video data can then be viewed, used, and/or processed by the first subscriber. The preprocessing as defined in the runtime configuration file can be tailored to the subscriber and the needs/uses of the subscriber and the processing to be performed by the subscriber. For example, the processing performed by the subscriber after publishing of the first video data may be using an artificial intelligence (AI) model to analyze scenarios occurring on/in the first video data. The AI model may require the first video data to be in a particular size, format, etc., which can be selected and applied during the preprocessing as set out in the runtime configuration file so that the subscriber does not need to perform this preprocessing before applying the AI model. The processing, by a computer processor, of the first video data by the subscriber can be performed distant from the camera, the location at which the runtime configuration file is stored and/or edited, and the gateway/container upon which the preprocessing is performed. The first subscriber can perform the processing of the video data to determine at least one output, with the output being indicative of an inference dependent on the first video data. For example, the first video data can be processed by an AI model to determine the amount of a particular product that has passed by on an assembly line (i.e., the amount of the product being an inference dependent on the first video data). The processing can include other operations, such as applying optical character recognition, clipping the first video data to make a video having a specific duration, and/or capturing one frame from the first video data to create a static image of a specific moment of the first video data.

The AI model can determine an output that is indicative of an inference, such as an output that is indicative that a particular product has passed through the field of view shown in the first video data. Whether the inference is correct may come under dispute. For example, a purchaser may dispute whether the manufacturer constructed the correct number of products (as counted by the AI model). In another example, a purchaser may dispute whether the product being constructed was without defects (as determined by the AI model). In such a situation, there may be a need to record the unaltered video data as well as the video data reviewed and potentially annotated by the AI model to provide unalterable, authenticated proof the inferences discovered/determined by the AI model. Recording the video data, annotated video data, and respective associated metadata can be performed by committing the data to a blockchain/distributed ledger, which creates an unalterable entry that can be referenced if the inferences or other information in the video data is disputed. Further entries can be committed to the blockchain ledger, such as an entry that includes video data for each inference that is discovered/determined by the AI model.

One embodiment of a method of committing video data and associated metadata to a blockchain ledger includes preprocessing the video data, by a first computer processor, according to preprocessing parameters defined within a runtime configuration file, wherein the video data is preprocessed to edit the video data to be suitable for use by a first artificial intelligence model. The method also includes accessing the preprocessed video data and associated metadata by the first artificial intelligence model with the first artificial intelligence model being configured to determine a first output that is indicative of a first inference dependent upon the preprocessed video data, formulating first annotated video data and associated metadata by the first artificial intelligence model that includes the first output indicative of the first inference, and accessing the preprocessed video data and associated metadata by a blockchain subscriber independent from the first artificial intelligence model. In response to a determination by the first artificial intelligence model that the first inference has occurred so as to prompt the formulation of the first output, the method includes committing a first entry to the blockchain ledger that includes the first annotated video data, metadata associated with the first annotated video data, the preprocessed video data, and metadata associated with the preprocessed video data.

Another embodiment includes a system for authenticating video data and metadata associated with the video data. The system includes a blockchain ledger and a gateway, which includes a first computer processor, that is configured to preprocess the video data according to preprocessing parameters defined within a runtime configuration file to edit the video data to be suitable for use by a first artificial intelligence model. The first artificial intelligence model is configured to access the preprocessed video data and associated metadata, determine a first output that is indicative of a first inference dependent upon the preprocessed video data, and formulate first annotated video data and associated metadata that includes the first output indicative of the first inference. The system also includes a blockchain subscriber, which is executed by a second computer processor, that is independent from the first artificial intelligence model and is configured to access the preprocessed video data and associated metadata and a sink in communication with the first artificial intelligence model and the blockchain subscriber. The sink is configured to, in response to a determination by the first artificial intelligence model that the first inference has occurred so as to prompt the formulation of the first output, commit a first entry to the blockchain ledger that includes the first annotated video data, metadata associated with the first annotated video data, the preprocessed video data, and the metadata associated with the preprocessed video data.

Figure 1:
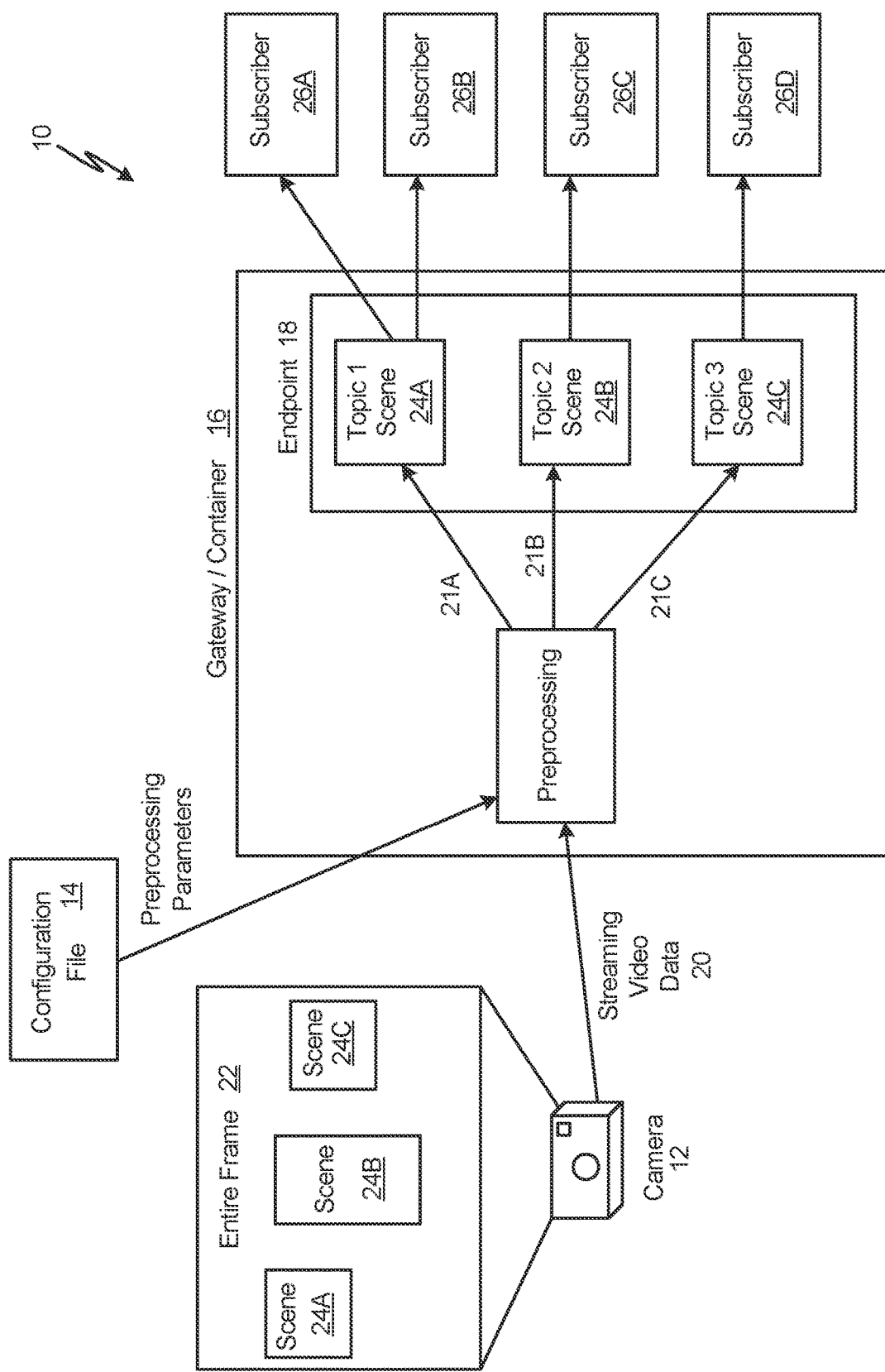
FIG. 1 is a schematic of the scene selection and preprocessing system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a schematic of system 10 for selection/extraction, preprocessing, and publishing to subscribers of video data of a region of interest (i.e., a scene) that is a subset of a first field of view of the streaming video. System 10 can include camera 12, configuration file 14, gateway/container 16, and publishing location/endpoint 18. Camera 12 can include streaming video data 20 having entire frame 22 with a first field of view. Scenes 24A, 24B, and 24C (i.e., individual regions of interest) can be selected/extracted from entire frame 22 each having a second field of view, a third field of view, and a fourth field of view, respectively, that are less than the first field of view of entire frame 22. Camera 12 collects streaming video data 20 and transfers/sends streaming video data 20 to gateway/container 16. Gateway/container 16 preprocesses streaming video data 20 according to preprocessing parameters defined in configuration file 14 and publishes (i.e., allows access/makes available) the preprocessed video data as first video data 21A (for scene 24A), second video data 21B (for scene 24B), and third video data 21C (for scene 24C) to publishing location/endpoint 18. Subscribers 26A-26D can subscribe to video data 21A-21A of each scene 24A-24C located at endpoint 18 to access each scene 24A-24C.

Scene 24A (i.e., a first region of interest) includes first video data 21A, scene 24B (i.e., a second region of interest) includes second video data 21B, and scene 24C (i.e., a third region of interest) includes third video data 21C that are each dependent upon streaming video data 20. In one example, first video data 21A forming scene 24A (i.e., a first region of interest) has a second field of view that is less than the first field of view comprising entire frame 22 shown by camera 12 (as streaming video data 20).

System 10 can include machine-readable storage media. In some examples, a machine-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media can be entirely or in part a temporary memory, meaning that a primary purpose storage media is not long-term storage. Storage media, in some examples, is described as volatile memory, meaning that the memory, does not maintain stored contents when power to system 10 (or the component(s) where storage media are located) is turned off. Examples of volatile memories can include random access memories (RAM), dynamic random-access memories (DRAM), static random-access memories (SRAM), and other forms of volatile memories. In some examples, storage media can also include one or more machine-readable storage media. Storage media can be configured to store larger amounts of information than volatile memory. Storage media can further be configured for long-term storage of information. In some examples, storage media include non-volatile storage elements. Examples of such non-volatile storage elements can include magnetic hard discs, optical discs, flash memories and other forms of solid-state memory, or forms of electrically programmable memories (EPROM) or electrically erasable and programmable (EEPROM) memories. Most generally, storage media is machine-readable data storage capable of housing stored data from a stored data archive.

System 10 can also include one or multiple computer/data processors. In general, the computer/data processors can include any or more than one of a processor, a microprocessor, a controller, a digital signal processor (DSP), an application specific integrated circuit (ASIC), a field-programmable gate array (FPGA), or other equivalent discrete or integrated logic circuitry. System 10 can include other components not expressly disclosed herein but that are suitable for performing the functions of system 10 and associated methods of preprocessing and processing video data and other forms of data. For example, system 10 can include communication software and/or hardware for pushing/sending configuration file 14 from storage media at a location distant from gateway/container 16, such as cloud storage, to gateway/container 16 for execution/implementation on streaming video data 20.

Camera 12 can be any device capable of collecting streaming video data 20, such as a Real Time Streaming Protocol (RTSP) camera or a USB camera. Streaming video data 20 can be video data that is continuously captured/recorded by camera 12 in any suitable format. Camera 12 can be positioned/located to provide streaming video data 20 displaying entire frame 22 with a first field of view. The first field of view shown/displayed by camera 12 can be a wide field of view that shows multiple regions of interest. Video data 20 being collected, for example, can show a wide field of view of a warehouse for storing commercial products and/or an assembly line producing commercial products of which each individual subscriber 26A-26D may only be interested in a region/scene 24A-24C that is a subset of entire frame 22. Camera 12 can collect and transfer streaming video data 20 in any resolution/video quality and any format, including (but not limited to) MP4, AVI, FLV, WMV, MOV, MPEG, Motion JPEG, AVCHD, WebM, and/or MKV. Camera 12 can transfer/send streaming video data 20 to gateway/container 16 over any suitable means, including via the internet, short-range wireless technology, or any other type of wired and/or wireless connection.

Configuration file 14 is an editable file that contains preprocessing parameters that define, among other instructions, how streaming video data 20 is to be preprocessed by gateway/container 16 to create video data 21A-21C. Configuration file 14 can include numerous other instructions for gateway/container 16, including which camera 12 to connect to (i.e., receive streaming video data 20 from), what portion of entire frame 22 to select/extract to create scenes 24A-24C (i.e., how to crop frame 22 to create scenes 24A-24C), and at which endpoint 18 to publish the preprocessed scenes 24A-24C. This is discussed in detail with regards to FIG. 2. Configuration file 14 can be edited/revised and pushed/conveyed to gateway/container 16 for execution in real time (i.e., runtime) such that an editor can revise the preprocessing parameters and those revisions can be applied to scenes 24A-24C at runtime. Configuration file 14 can be an executable program file or have another format for including instructions and conveying information that is then used by gateway/container 16 to apply the preprocessing to video streaming data 20. Additionally, configuration file 14 can be stored in storage media adjacent to and/or part of gateway/container 16 or in storage media distant from gateway/container 16, such as in the cloud. Configuration file 14 can be accessible only by one editor or can be accessible by multiple parties (e.g., editors), which may include subscribers 26A-26D who can edit the preprocessing parameters defined by/within configuration file 14 to instruct gateway/container 16 to preprocess one or each of scenes 24A-24C depending on the needs/desires of subscribers 26A-26D, respectively.

Gateway/container 16 can include a computer processor capable of performing instructions provided by configuration file 14, which can include preprocessing parameters that are to be applied to streaming video data 20. Gateway/container 16 can be a gateway node, edge device, container, virtual machine, or other software and/or hardware able to accept configuration file 14 and perform the instructions therein to apply the preprocessing parameters to streaming video data 20. Further, gateway/container 16 can be within a single computer hardware set up due to virtualization. Gateway/container 16 can include one or multiple storage media for storing information, such as the preprocessing parameters pushed/sent to gateway/container 16 by/from configuration file 14 and/or other information like streaming video data 20. Gateway/container 16 can be located at various locations, including adjacent to camera 12 and/or on the same network as camera 12, distant from camera 12 with streaming video data 20 being received by gateway/container 16 from camera 12 via a wired or wireless connection, in the cloud, or at multiple locations. Gateway/container 16 is in communication with configuration file 14 to accept instructions for applying preprocessing parameters. Additionally, gateway/container 16 may be configured to contact configuration file 14 to determine if configuration file 14 has been edited. If edited, gateway/container 16 can perform preprocessing (on streaming video data 20 being received) according to the newly edited configuration file 14. In other examples, gateway/container 16 can utilize preprocessing parameters or other information included within configuration file 14 on a period basis, and can utilize changes (or edits) made to configuration file 14 when encountered in a next iteration of the period.

For clarity, streaming video data 20 is unaltered video data that is received by gateway/container 16 from camera 12, whereas first video data 21A is video data that has been preprocessed by gateway/container 16 (according to preprocessing parameters defined in configuration file 14) to create scene 24A. Similarly, second video data 21B is video data that has been preprocessed to create scene 24B, and third video data 21C is video data that has been preprocessed to create scene 24C. For each of first, second, and third video data 21A-21C, the originating video data is streaming video data 20 (which can be converted to raw video data 20A as described with regards to FIG. 3 below). Each of scenes 24A-24C can be a subset of entire frame 22 and show second, third, and fourth fields of view, respectively, that are less than the first field of view of entire frame 22. However, other scenes can have the same field of view as first field of view of entire frame 22 and instead, other editing is performed on that scene besides cropping; for example, that scene can be edited to be in grayscale whereas entire frame 22 of streaming video data 20 is in color.

Gateway/container 16 can be in communication with endpoint 18 to which gateway/container 16 publishes the preprocessed video data 21A-21C (e.g., scenes 24A-24C). The communication can be wired or wireless, such as communication via the internet. However, endpoint 18 can be at the same location as gateway/container 16 or on the same computer hardware set up and/or network. Further, endpoint 18 can be located on the internet with a unique address and/or security protocol that allows for subscription and access to scenes 24A, 24B, and 24C. Scenes 24A, 24B, and 24C can be published to endpoint 18 using an asynchronous messaging library, for example ZeroMQ, such that scenes 24A, 24B, and 24C are published as topic 1, topic 2, and topic 3, respectively. Subscribers 26A-26D can subscribe to any of topics 1-3 to receive video data 21A-21C of scenes 24A, 24B, 24C, respectively. Gateway/container 16 can publish video data 21A-21C of each of scenes 24A-24C to endpoint 18 in any format suitable for use by subscribers 26A-26D. For example, video data 21A-21C can each be published as Motion JPEG or any of the formats listed above with regards to streaming video data 20. The format that video data 21A-21C of each of scenes 24A-24C can be designated in configuration file 14 and applied to video data 21A-21C by gateway/container 16.

Each scene 24A-24C at topics 1-3, respectively, can be subscribed to by any number of subscribers 26A-26D. In the example shown in FIG. 1, scene 24A has two subscribers 26A and 26B, while scene 24B has one subscriber 26C, and scene 24C has one subscriber 26D. Video data 21A-21C of each of scenes 24A-24C can be further processed by subscriber 26A-26D, respectively, depending on the desired output/inference to be determined from video data 21A-21C. For example, first video data 21A of scene 24A can be further processed by an AI model to determine the amount of a particular product that has passed by camera 12 (in the second field of view of scene 24A) on an assembly line. This is described in detail with regards to FIG. 5.

Figure 2:
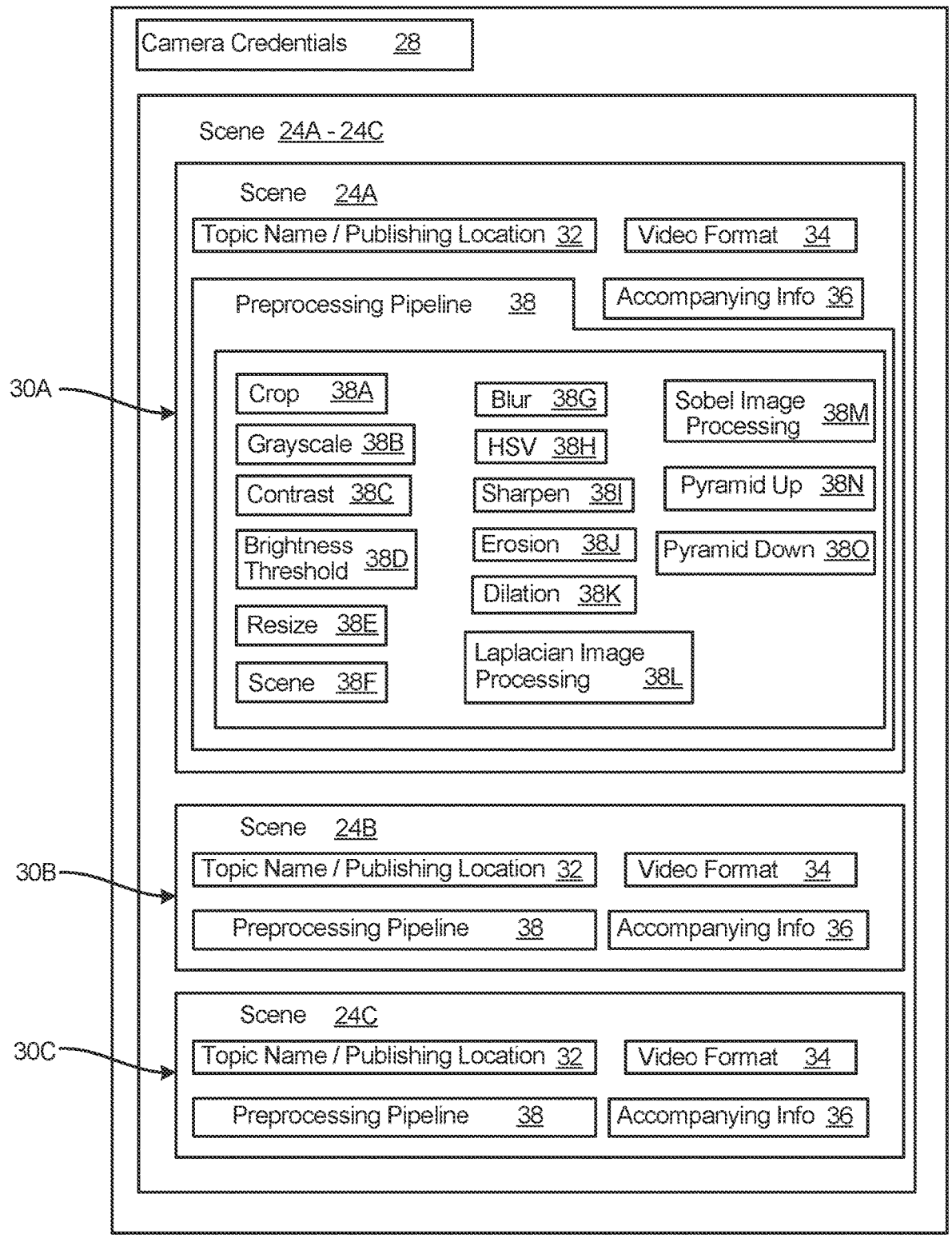
FIG. 2 is a schematic of the runtime configuration file.

FIG. 2 is a schematic of configuration file 14. Each "component" of configuration file 14 can be one or a set of instructions that, when executed by gateway/container 16, applies a process/edit. Thus, while this disclosure may discuss the components of configuration file 14 as being physical, tangible elements, the components can be one or multiple groups of executable software code contained within configuration file 14. Configuration file 14 includes information regarding camera credentials 28 and preprocessing parameters 30A-30C corresponding to scenes 24A-24C. Preprocessing parameters 30B and 30C can include the same type of information/parameters as preprocessing parameters 30A. However, for simplicity, the possibilities of information/parameters shown in FIG. 2 with regards to preprocessing parameters 30A are not shown for preprocessing parameters 30B and 30C. However, preprocessing parameters 30B and 30C can be the same or different from each other and from preprocessing parameters 30A corresponding to scene 24A. Preprocessing parameters 30A can include topic name/publishing location 32, video format 34, accompanying information 36, and preprocessing pipeline 38 having various video edits 38A-38O. Video edits 38A-38O can include the nonexclusive list of crop 38A, grayscale 38B, contrast 38C, brightness 38D, threshold 38E, resize 38F, blur 38G, hue saturation value (HSV) 38H, sharpen 38I, erosion 38J, dilation 38K, Laplacian image processing 38L, Sobel image processing 38M, pyramid up 38N, and pyramid down 38O.

Configuration file 14 can be edited and pushed/conveyed to gateway/container 16 in real time (i.e., runtime) such that preprocessing parameters 30A-30C (and the other information contained in configuration file 14) can be applied to streaming video data 20 immediately to preprocess and output video data 21A-21C. Configuration file 14 can be stored, edited, and/or pushed/conveyed to gateway/container 16 in any suitable format/file type, such as a text file, a comma separated value file, or other format/file type. Configuration file 14 can include other information/parameters not expressly disclosed herein and not shown in FIG. 2.

Configuration file 14 can include camera credentials 28, which provides the information needed for gateway/container 16 to connect to camera 12 and/or receive streaming video data 20 from camera 12. Camera credentials 28 can include other information such as encryption/decryption information, security access information, and/or instructions for beginning and/or ending the collection of streaming video data 20 by camera 12. Camera credentials 28 can include information for connecting to multiple cameras 12 and/or information for gateway/container 16 to receive the same or different streaming video data 20 from the same or different cameras 12 for different scenes 24A-24C. In one example, camera credentials 28 are provided once and applied to all scenes 24A-24C. In another example, different camera credentials 28 are provided for each scene 24A-24C and applied to each of scenes 24A-24C individually.

Configuration file 14 also includes information specific to each scene 24A-24C. The information/instructions are designated as preprocessing parameters 30A, 30B, and 30C, respectively. Preprocessing parameters 30A-30C are used by gateway/container 16 (e.g., in the form of executable instructions or indications of the executable instructions) and applied to streaming video data 20 to create video data 21A-21C of scenes 24A-24C, respectively. Preprocessing parameters 30A-30C can include topic name/publishing location 32, which designates where video data 21A-21C of scenes 24A-24C will be published after preprocessing. As described below with regards to gateway/container 16 and FIG. 3, publishing location 32 can be a proxy location which is then relayed to unified endpoint 18 to make locating the topic/scenes 24A-24C easier for subscribers 26A-26D. Publishing location 32 can be any other location suitable for providing access to subscribers 26A-26D.

Configuration file 14 can designate video format 34 that each of scenes 24A-24C is to be published at, which can be the same format as streaming video data 20 or any other type of suitable video format, including the formats listed above with regards to streaming video data 20 and/or video data 21A-21C. Scenes 24A-24C can be published having the same video format 34 or different video formats 34. If the format of the video data of scenes 24A-24C is to be changed, the steps of changing the video format can be performed before, during, or after any of the other instructions/steps set out in preprocessing parameters 30A-30C. For example, video format 34 can be changed before, during, or after video edits 38A-38O are performed by gateway/container 16.

Preprocessing parameters 30A-30C can also include accompanying information 36, which is information provided/published with video data 21A-21C for each of scenes 24A-24C. Accompanying information 36 can include any information about first video data 21 that may be of use to subscribers 26A-26C. For example, accompanying information 36 can include first video data 21A frame size, which may be helpful in indicating to subscriber 26A what processing should be performed on first video data 21A of scene 24A; if the frame size is 720 pixels by 486 lines, first video data 21A of scene 24A may be most suitable for processing by an AI model. Accompanying information 36 can include metadata and/or other information regarding what preprocessing has been performed on streaming video data 20 to create video data 21A-21C for scenes 24A-24C, respectively.

Preprocessing parameters 30A-30C can also include preprocessing pipeline 38 that includes numerous video edits 38A-38O that can be applied to streaming video data 20 to create video data 21A-21C for each of scenes 24A-24C. Preprocessing pipeline 38 can designate the instructions for the entire video edits made to streaming video data 20 for each of scenes 24A-24C. The amount of time gateway/container 16 takes to perform the video edits designated by preprocessing pipeline 38 (i.e., video edits 38A-38O) for each of scenes 24A-24C can be measured, recorded, and displayed as preprocessing performance metrics (see FIG. 4). The order in which video edits 38A-38O are performed can be optimized (or otherwise enhanced for increasing accuracy, decreasing bandwidth or latency, etc.) by gateway/container 16 and/or optimized within configuration file 14 to reduce the amount of time gateway/container 16 takes to perform preprocessing pipeline 38. This optimization can be done manually by an editor (e.g., the individual with access to edit configuration file 14) or automatically by system 10. For example, depending on which video edits 38A-38O are to be performed in preprocessing pipeline 38 by gateway/container 16, the order of performance of those video edits 38A-38O can be rearranged to reduce the amount of time gateway/container 16 takes to perform preprocessing pipeline 38. In one example, crop 38A is the first video edit 38A-38O to be performed, followed by other video edits 38B-38O.

Video edits 38A-38O are a nonexclusive list of edits that can be designated in configuration file 14 and performed on streaming video data 20 by gateway/container 16. Preprocessing pipeline 38 can include other video edits not expressly included in the list of video edits 38A-38O. Similarly, not all of video edits 38A-38O need to be performed to create video data 21A-21C of each of scenes 24A-24C, and different scenes 24A-24C can include different video edits 38A-38O performed on streaming video data 20 by gateway/container 16. In one example, only crop 38A is performed on streaming video data 20 to create first video data 21A of scene 24A, while a different crop 38A and brightness 38D, resize 38E, and dilation 38K are performed on streaming video data 20 to create second video data 21B of scene 24B that is different than first video data 21A of scene 24A.

Each of video edits 38A-38O are briefly described as follows. Crop 38A is the removal of unnecessary areas/regions (i.e., regions that are not of-interest to the subscriber) of entire frame 22 having first field of view to create scenes 24A-24C each with second, third, and fourth field of views, respectively. Scenes 24A-24C that have been cropped 38A have fields of view that are a subset of (i.e., less than) first field of view of entire frame 22. Grayscale 38B is the alteration of the color of video data 21A-21C and can include limiting the color to be between white and black. Contrast 38C is the alteration of the difference between the maximum and minimum pixel intensity. Brightness 38D is the alteration in the luminous brightness of video data 21A-21C. Threshold 38E is the alteration of the color of video data 21A-21C by changing the color of select pixels of video data 21A-21C that are above a specified threshold color value. Resize 38F is the alteration of the frame size of video data 21A-21C without cutting/cropping any of the frame out. Blur 38G is the alteration of the clarity of video data 21A-21C, which may be desired for some processing applications, such as an AI model, performed by subscribers 26A-26D. Hue saturation value (HSV) 38H is assigning a numerical readout of video data 21A-21C that corresponds to the color contained therein. Sharpen 38I is altering video data 21A-21C to make the objects therein appear more defined/sharpened. Erosion 38J is altering video data 21A-21C by shrinking pixels and/or removing pixels on object boundaries, while dilution 38K is the reverse of erosion in that video data 21A-21C is enlarged by resizing pixels and/or adding pixels at object boundaries. Laplacian image processing 38L and Sobel image processing 38M are processing techniques known in the art that can be applied to video data 21A-21C. Pyramid up 38N and pyramid down 38O are altering video data 21A-21C by smoothing and/or subsampling as known in the art. Each of scenes 24A-24C can include these and other video edits 38A-38O to be applied by gateway/container 16 to preprocess streaming video data 20 and output as scenes 24A-24C for use by subscribers 26A-26D.

Configuration file 14 can arrange the instructions of camera credentials 28 and preprocessing parameters 30A-30C to be performed in any order, or gateway/container 16 can have the capabilities to arrange/rearrange the information/instructions to be performed in a desired/optimized sequence. Additionally, gateway/container 16 can be configured to perform each set of preprocessing parameters 30A-30C in parallel such that preprocessing parameters 30A, preprocessing parameters 30B, and preprocessing parameters 30C are performed at the same time (and the time gateway/container 16 takes to perform those preprocessing parameters are measured, recorded, and displayed as metrics). Configuration file 14 can be edited at any time by an editor and then pushed/conveyed/accessed by gateway/container 16 at runtime such that the preprocessing of video data 21A-21C is altered according to the newly edited configuration file 14 at runtime.

Figure 3:
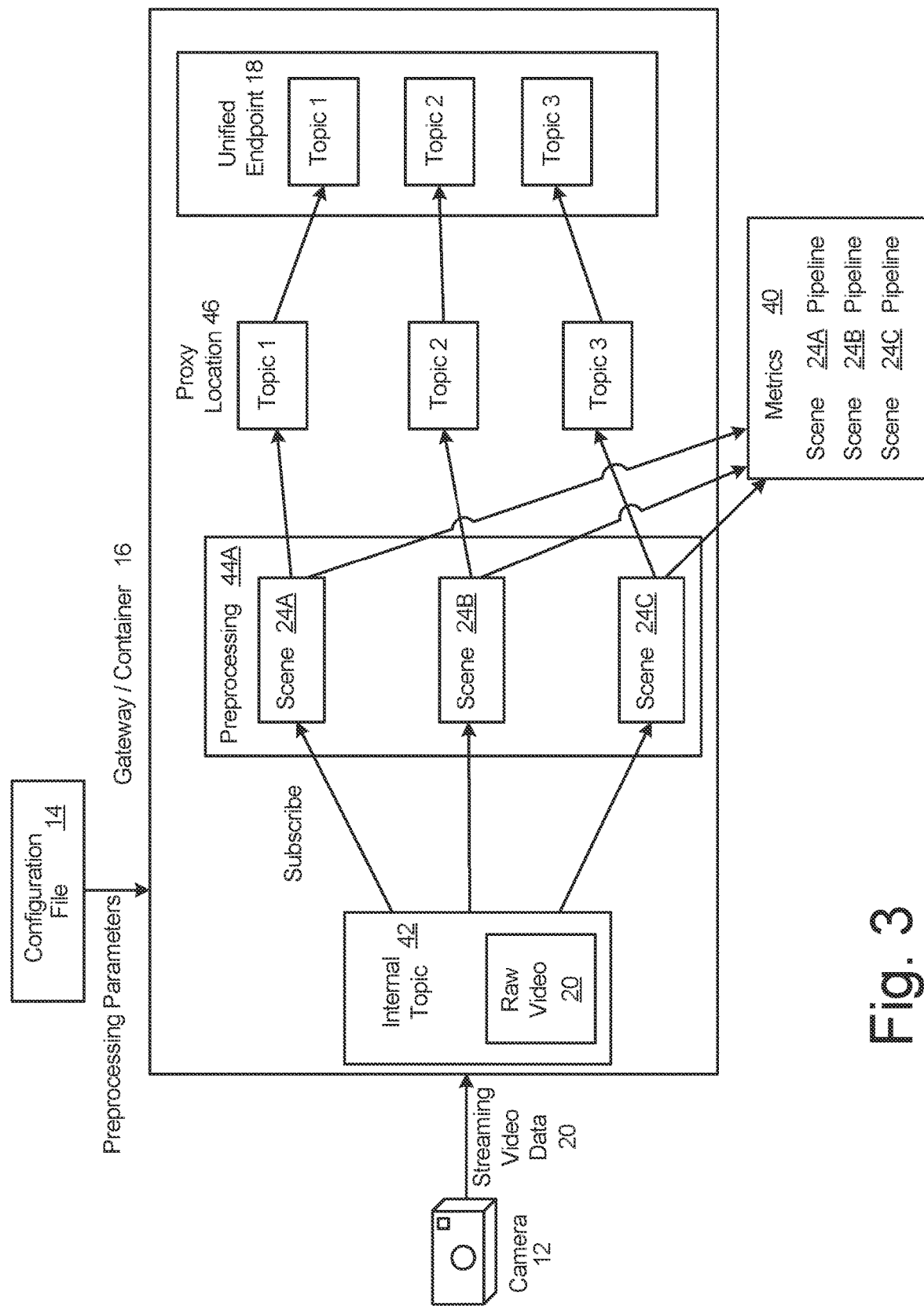
FIG. 3 is a schematic of a gateway/container along with the inputs and outputs of the gateway/container.

FIG. 3 is a schematic of gateway/container 16 (hereinafter, "gateway 16") along with inputs to and outputs from gateway 16. Each "component" of gateway 16 (and corresponding inputs and outputs) can be one or a set of instructions, programs, processors, storage media locations, and/or other software or hardware used to select/extract, preprocess, and publish video data 21A-21C as scenes 24A-24C. Thus, while this disclosure may discuss the components of gateway 16 (and corresponding inputs and output) as being physical, tangible elements, the components can be partially or entirely contained within software and/or hardware.

Inputs to gateway 16 can be streaming video data 20 (received from camera 12) and configuration file 14, which includes camera credentials 28 and preprocessing parameters 30A-30C. Outputs from gateway 16 can be scenes 24A-24C to unified endpoint 18, which is the location at which scenes 24A-24C are published as topics 1-3, and metrics 40, which is the location at which preprocessing pipeline 38 information (i.e., the amount of time gateway 16 takes to apply preprocessing parameters 30A-30C to streaming video data 20 to create scenes 24A-24C) is published/accessible. Gateway 16 can include raw video data 20A, which is streaming video data 20 that has been published at internal topic 42 and to which gateway 16 subscribes to receive video data used to create each of scenes 24A-24C. Gateway 16 can include preprocessing pipeline optimization and preprocessing 44, which uses preprocessing parameters 30A-30C as defined in configuration file 14 to preprocess streaming video data 20 (accessed as raw video data 20A at internal topic 42) to create scenes 24A-24C. Gateway 16 publishes scenes 24A-24C to proxy location 46 at topics 1-3, respectively. Gateway 16 can then publish/relay scenes 24A-24C (having video data 21A-21C) from proxy location 46 to unified endpoint 18.

Gateway 16 receives streaming video data 20 from camera 12 and can publish the video data as raw video data 20A at internal topic 42. This configuration provides for a constant, known location of published raw video data 20A independent of where the original streaming video data 20 is received from. Thus, if the location where streaming video data 20 is being received from changes (e.g., if one camera is disconnected but another camera comes online), raw video 20A will still be accessible at internal topic 42 without the need to change where gateway 16 is looking for video data to create scenes 24A-24C, thus ensuring a smooth transition of incoming streaming video data 20. Raw video data 20A published at internal topic 42 can be configured such that only gateway 16 has access.

Gateway 16 can be provided with the information in configuration file 14 (i.e., camera credentials 28 and preprocessing parameters 30A-30C) via a variety of avenues. In one example, gateway 16 has location information of configuration file 14 and actively accesses configuration file 14. In another example, configuration file 14 is pushed/conveyed to gateway 16 once, periodically, or continuously and gateway 16 passively waits to begin preprocessing streaming video data 20 until configuration file 14 has been received. Another example can be a combination of the two above examples in that gateway 16 actively accesses configuration file 14 at the beginning of preprocessing (and continues preprocessing following those known instructions) and configuration file 14 is pushed/conveyed to gateway 16 only after configuration file 14 has been edited/revised.

Gateway 16 can perform pipeline optimization on preprocessing parameters 30A-30C As discussed above, pipeline optimization can be performed by gateway 16 (or another component) to reduce the time gateway 16 takes to preprocess raw video data 20A to create video data 21A-21C (and attach any additional information) of scenes 24A-24C and/or to increase accuracy of the preprocessing operations. Pipeline optimization can include arranging/rearranging the order in which video edits 38A-38O are performed by gateway 16.

Gateway 16 can then, according to preprocessing parameters 30A-30C defined within configuration file 14, preprocess 44 raw video data 20A (which is derived from and similar to streaming video data 20) to edit raw video data 20A to create video data 21A-21C of scenes 24A-24C. The preprocessing to create each of scenes 24A-24C can be performed individually for each scene and can be performed in parallel (i.e., simultaneously). The preprocessing performed by gateway 16 can edit each of scenes 24A-24C to the desires/needs of subscribers 26A-26C, respectively. For example, gateway 16 can preprocess raw video data 20A to crop a first field of view of entire frame 22 to eliminate areas/regions of the first field of view that are of no interest to subscriber 26A and keep a second field of view of, for example, scene 24A that is a subset of the first field of view. Thus, further processing by subscriber 26A (or subscriber 26B) does not need to be performed on the areas (regions not of-interest) eliminated/trimmed by the cropping performed during preprocessing. In this example, the cropping reduces the processing time and resources needed by subscriber 26A. The alteration of video format can be included in the preprocessing and/or can be performed before, during, or after the application of other preprocessing parameters 30A-30C.

Scenes 24A-24C, which are made up of raw video data 20A that has been preprocessed according to configuration file 14 to create video data 21A-21C, are published/sent to proxy location 44. Because scenes 24A-24C are continuous video data, scenes 24A-24C are continuously published (e.g., made available) to subscribers 26A-26C, respectively. Scenes 24A-24C are published/sent first to proxy location 44 and then relayed to unified endpoint 18. Having scenes 24A-24C first being published/sent to proxy location 44 ensures that, no matter what path scenes 24A-24C take, video data 21A-21C of scenes 24A-24C will always end up at proxy location 44 and then be relayed to unified endpoint 18. Because scenes 24A-24C always end up at proxy location 44, unified endpoint 18 always knows the location to access scenes 24A-24C and can actively look to proxy location 44 to obtain scenes 24A-24C or passively wait for scenes 24A-24C to be published/sent to unified endpoint 18.

During preprocessing to create scenes 24A-24C, the amount of time gateway 16 takes to apply all of preprocessing parameters 30A-30C to raw video data 20A to create scenes 24A-24C, respectively, (or the amount of time gateway 16 takes to apply only video edits 38A-38O of preprocessing pipeline 38, depending on the desired measurement) is measured, recorded, and published at metrics 40 for viewing by an editor or any party with access. Metrics 40 can be published on an asynchronous messaging library like ZeroMQ (similar to the publishing of scenes 24A-24C) or can be displayed on a user interface similar to FIG. 4, which shows a display of scene preprocessing performance metrics 40A. Metrics 40 can be outputted from gateway 16 to numerous other systems and/or locations, including to the cloud or another location distant from gateway 16.

Figure 4:
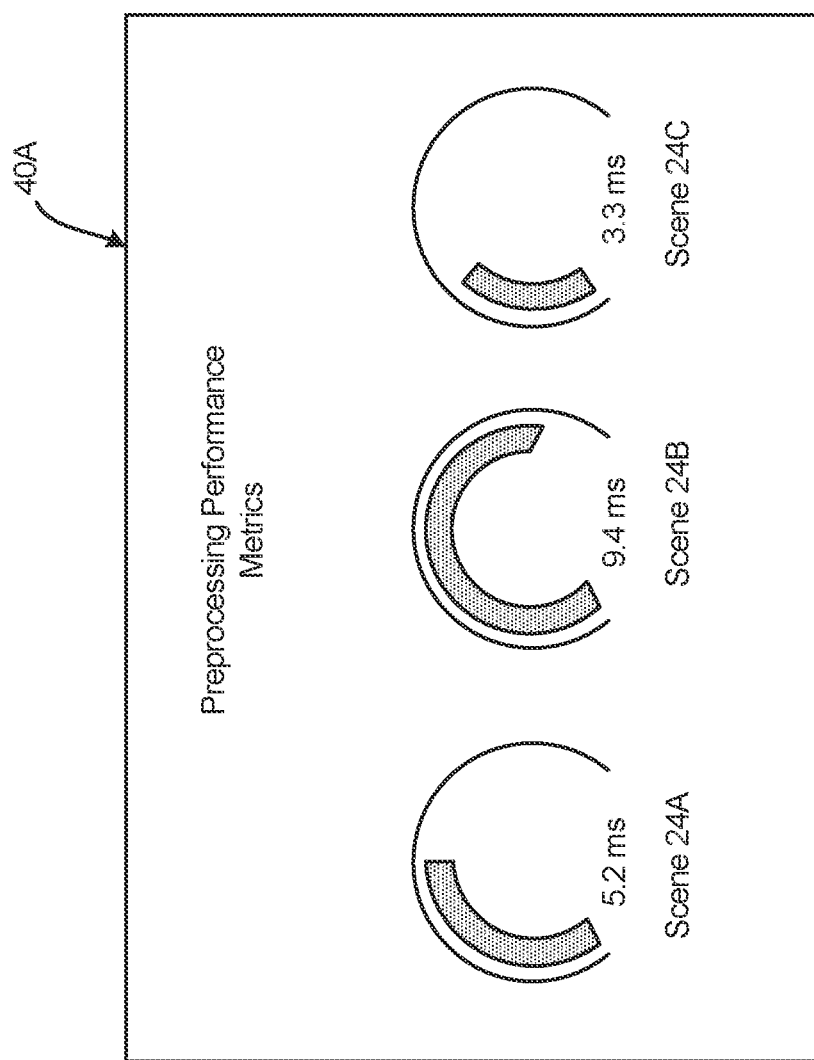
FIG. 4 is a display of the scene preprocessing performance metrics.

As shown in FIG. 4, scene preprocessing performance metrics 40A show a value of time for each of scenes 24A-24C. This value of time displayed is the amount of time gateway 16 takes to apply preprocessing parameters 30A-30C for each of scenes 24A-24C. Alternatively, this value of time displayed can be the amount of time gateway 16 takes to apply only video edits 38A-38O of preprocessing pipeline 38 and not the entirety of preprocessing parameters 30A-30C. This measurement may be desired because the other instructions/information of preprocessing parameters 30A-30C (other than video edits 38A-38O) may not change between scenes 24A-24C while preprocessing pipeline 38 (the video edits 38A-38O being applied) may be drastically different from scene to scene and thus the amount of time for performing preprocessing pipeline 38 may vary greatly from scene to scene.

For example, preprocessing performance metrics 40A in FIG. 4 show an amount of time gateway 16 takes to perform the video edits of preprocessing pipeline 38 for scene 24A as 5.2 milliseconds (ms), for scene 24B as 9.4 ms, and for scene 24C as 3.3 ms. In this example, it may be desirable or necessary to alter preprocessing parameters 30B in configuration file 14 (either remove some edit and/or rearrange the order in which those edits are performed by gateway 16) to reduce the amount of time gateway 16 takes to apply preprocessing pipeline 38 to create/alter scene 24B. As discussed above, gateway 16 can have the capability to optimize the order in which the edits/instructions in preprocessing parameters 30A-30C and/or preprocessing pipelines 38 are performed to reduce the amount of time needed to preprocess/apply the edits/instructions. Thus, preprocessing performance metrics 40A as shown in FIG. 4 may be the shortest amount of time gateway 16 takes to perform preprocessing parameters 30A-30C (or preprocessing pipeline 38, depending on the chosen measuring points).

Scenes 24A-24C can be published from proxy location 44 to unified endpoint 18 as topics 1-3 within an asynchronous messaging library, such as ZeroMQ. Unified endpoint 18 allows for a known, constant location to which subscribers 26A-26C can look to access scenes 24A-24C, respectively. If more scenes are created, those scenes would be published and accessible at unified endpoint 18, so subscribers 26A-26D and/or other subscribers would know where to look to access the additional scenes.

Figure 5:
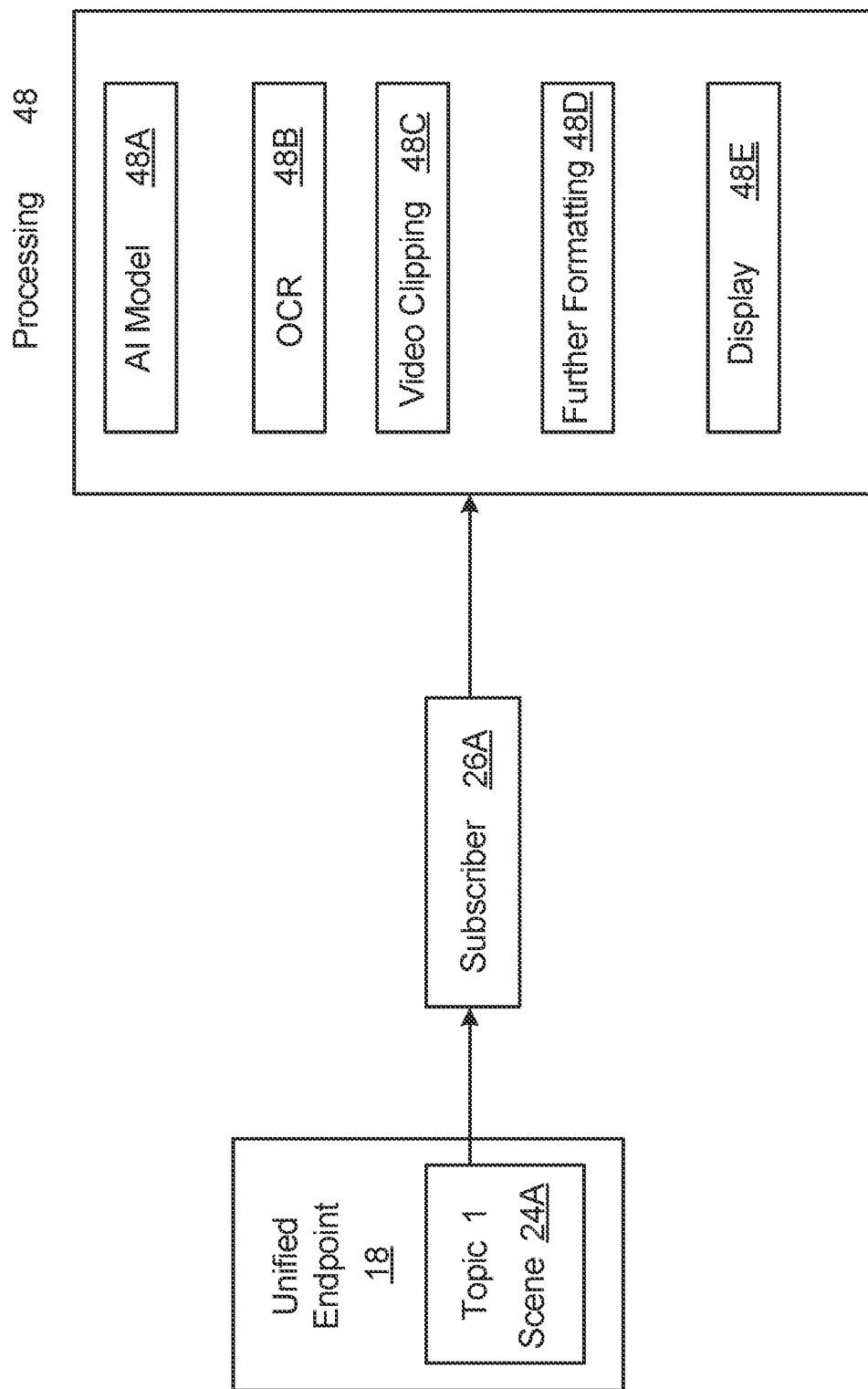
FIG. 5 is a schematic of potential processing by a first subscriber.

FIG. 5 is a schematic showing processing 48 capable of being performed on scene 24A by first subscriber 26A. Processing 48 can also be performed on scenes 24B and 24C or other scenes not disclosed herein.

After being published/sent to endpoint 18, scenes 24A-24C are available to be subscribed to and accessed by subscribers 26A-26D. Each scene can be subscribed to by any number of subscribers as is necessary/desirable. For example, a scene may be subscribed to by numerous subscribers each running processing 48 that includes different AI models. In this example, one AI model can be determining the amount of a first product that is passing through the scene on an assembly line, while a second AI model can be determining the amount of a second product that is passing through the scene on the same assembly line. In this case, the scene is unchanged between the two AI models (i.e., between the two subscribers) but the processing performed by each subscriber after the scene has been published is different. It should be noted that one entity (e.g., a person, company, quality control sector) can subscribe to a scene multiple times and thus constitute multiple subscribers. As discussed above, the preprocessing performed to create/alter each scene can be tailored to the needs of the subscriber(s) to, for example, reduce processing 48 resources and time needed to determine at least one output that is indicative of an inference the subscriber is aiming to ascertain.

The example in FIG. 5 shows first subscriber 26A performing processing 48 on scene 24A. Processing 48, as selected and executed by subscriber 26A (either automatically and/or manually by a computer processor and/or other hardware and software), can include AI model 48A, optical character recognition (OCR) 48B, video clipping 48C, further formatting 48D, and display 48E of the video data of scene 24A. Processing 48 can include other instructions/edits not expressly disclosed in FIG. 5 and listed above.

The disclosed potential instructions/edits that subscriber 26A can perform in processing 48 are as follows. AI model 48A can be a program/model that may have machine learning and can use scene 24A to determine at least one output indicative of an inference dependent upon scene 24A. The inference, for example, can be the amount of a specific product that is viewable in scene 24A over a defined period of time. AI model 48A can also be, for example, a program/model that determines how many people appear in scene 24A over a defined period of time. AI model 48A can include other capabilities and/or configurations. OCR 48B can be a program (or other configuration) that recognizes and records any characters (i.e., text) that appear in scene 24A. For example, scene 24A can be video data of a street and OCR 48B will recognize and record any text that appears on the side of a vehicle, such as a delivery truck, that is in scene 24A. Video clipping 48C can clip the video data shown in scene 24A to create a clip of a defined period of time, and/or video clipping 48C can clip the video data shown in scene 24A to create a static image of a defined moment in time. Further formatting 48D can be video edits, such as video edits 38A-38O in configuration file 14, or any other video or file formatting that are performed by subscriber 26A. For example, further formatting 48D can include cropping scene 24A to be a subset of the second field of view shown in scene 24A. Display 48E can be making scene 24A viewable on a screen or other visual display. Display 48E can also include any video formatting/reconfiguring that is necessary to effectuate the display of scene 24A. While video edits 38A-38O and further formatting 48D to create and/or process video data 21A-21C have included only edits to the video/image, edits can include editing the audio or other aspects of the video data.

The potential instructions/edits (i.e., processing 48) can be performed in parallel or series. Further, processing 48 can be configured such that instructions/edits 48A-48E work together such that one instruction/edit is prompted by an inference from another instruction/edit. For example, video clipping 48C can be configured to work in tandem with another edit/process; if AI model 48A determines that a product is defective, video clipping 48C can be prompted to record and clip a particular duration (or moment to create a static image) of scene 24A showing the defective product and save the clip (or image) for proof/validation.

System 10, with associated methods, for selection/extraction, preprocessing, and publishing of streaming video data 20 into scenes 24A-24C and for processing scenes 24A-24C is used to determine at least one output that is indicative of an inference dependent upon video data 21A-21C. System 10 reduces the preprocessing/processing time and resources necessary for accomplishing the desired output/determining the selected inference. System 10 allows for a streamlined process that extends from collecting streaming video data 20 from camera 12 to making preprocessing scenes 24A-24C available to subscribers 26A-26C for further processing and analysis/determinations. System 10 also allows for measurement, recordation, and viewing of preprocessing performance metrics 40 and optimization of preprocessing pipeline 38 (and/or preprocessing parameters 30A-30C) to reduce the amount of time and resources needed to apply preprocessing parameters 30A-30C to streaming video data 20 (i.e., raw video data 20A) to create video data 21A-21C of scenes 24A-24C.

Figure 6:
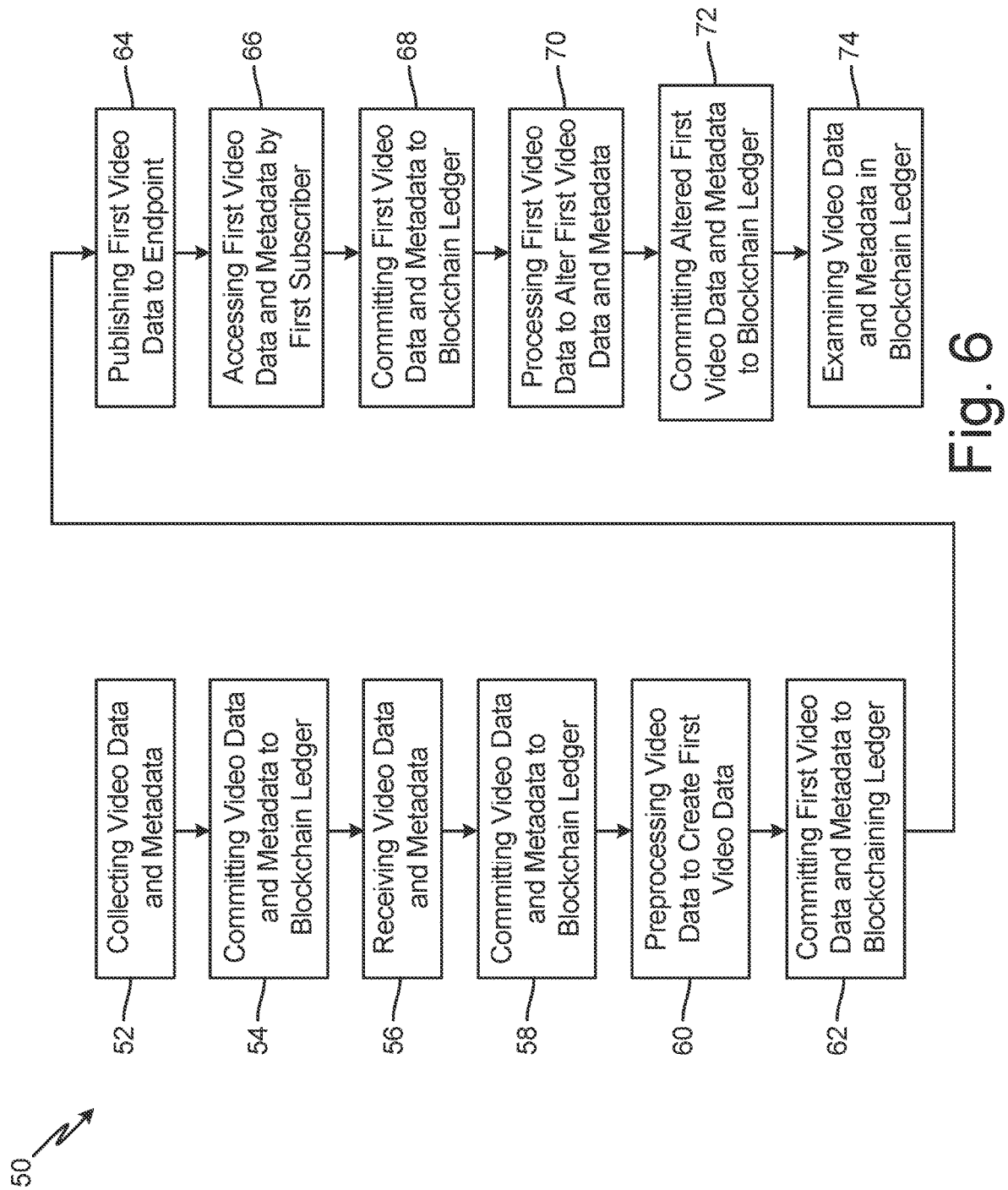
FIG. 6 is a flow chart showing a method of validating the authenticity of the video data throughout selection, preprocessing, publishing, accessing, and processing of the video data.

FIG. 6 shows a flow chart of method 50 for validating the authenticity of video data throughout selection, preprocessing, publishing, accessing, and processing of the video data. Throughout method 50, the video data after each step is committed to a blockchain ledger to record and authenticate the video data to ensure the video data has not been manipulated and to keep a record of the state/properties of the video data after receiving, preprocessing, publishing, accessing, and processing the video data. Committing the video data to the blockchain ledger, with validation by multiple nodes of the distributed ledger, after each step and/or after the video data has changed hands (from one computer processor, network, and/or location to another) prevents manipulation of the video data without evidence of the manipulation because the video data committed to the blockchain ledger cannot be edited/modified/manipulated after the video data has been committed to the blockchain ledger. Thus, if the video data has been manipulated, a clear record has been formed and examination of the blockchain entries of the video data (and associated metadata) will show when (and by whom) the video data was manipulated.

Method 50 includes many of the same steps as set out in the method associated with system 10. However, method 50 includes the steps of committing the video data (and associated metadata) to the blockchain ledger regularly. Method 50 can include other steps not expressly disclosed herein, and the steps of method 50 can be altered and/or performed in any sequence without departing from the scope of the invention.

Step 52 includes collecting streaming video data by a camera or other streaming video source. The video data can be collected by, for example, camera 12. The collection of the streaming video data can be the creation of the video data by continuously recording a potentially ever-changing frame (with a field of view) by the camera. For example, camera 12 can record the inside of a warehouse in which consumer products are temporarily stored before being shipped out to one or multiple stores. The collection of streaming video data can be the recording of the movement of those products (and machinery used to move the products).

Step 54 includes committing the streaming video data and associated metadata to a blockchain ledger. Step 54 can be performed after the streaming video data (and associated metadata) has been collected/created, or step 54 can be performed at a time before the video data is conveyed/sent to a first computer processor (e.g., gateway 16). Alternatively, step 54 of committing the video data and metadata to the blockchain ledger can be performed at any other time before being conveyed/sent out from the camera. With the streaming video data and metadata being committed to the blockchain ledger prior to transmission of the video data and metadata from the camera (or from the network to which the camera is connected), a first chain/record of the video data and metadata is recorded in the blockchain ledger for later validation and authentication.

Committing the streaming video data (or first video data or altered first video data) to the blockchain ledger can include submitting and saving the streaming video data (and associated metadata) in multiple nodes of a distributed ledger (i.e., distributed ledgers). The distributed ledgers interact to confirm that the streaming video data submitted and saved is identical across all ledgers. Thus, the video data cannot practically be changed/manipulated after it has been committed to the blockchain ledger without evidence of such manipulation because the changes would need to be made to all of the identical entries of that streaming video data in each of the distributed ledgers. This characteristic of the blockchain ledger allows for commitment/recordation of the video data to prevent manipulations/modifications of the video data.

Step 56 includes conveying/sending the streaming video data and metadata from the camera to the first computer processor, such as gateway 16. In other words, step 56 includes receiving the streaming video data and metadata by the first computer processor (e.g., gateway 16). As with system 10 above, camera 12 and gateway 16 can be, for example, distant from one another or physically or virtually adjacent to one another, such as being on the same network.

Step 58 includes committing the streaming video data and metadata to the blockchain ledger. After the streaming video data (and metadata) has been transmitted from the camera to the first computer processor (e.g., gateway 16), the streaming video data and metadata can be committed to the blockchain ledger to ensure that the streaming video data and metadata has not been manipulated between the time the streaming video data was collected by the camera and the time the streaming video data is received by the first computer processor. Manipulation of the video data can be identified, for example, by comparing the streaming video data and metadata recorded in the blockchain ledger in step 54 to the streaming video data and metadata recording in the blockchain ledger in step 58. If the two entries of streaming video data (and metadata) are different, then the streaming video data (and metadata) can be identified as altered or otherwise manipulated. If the two entries are identical, then the streaming video data (and metadata) can be identified as having not been altered or otherwise manipulated.

Step 60 includes preprocessing the streaming/incoming video data, by the first computer processor, according to preprocessing parameters defined within the configuration file (which can be edited/revised and updated at runtime). The preprocessing can include formatting the streaming/incoming video data to create first video data that is a subset of the streaming/incoming video data. For example, the first video data can have a first field of view that is less than a second field of view of the streaming/incoming video data collected by the camera. The preprocessing of the streaming video data according to the preprocessing parameters in the runtime configuration file to create the first video data can include other edits to the video data and the associated metadata as described above with regards to FIGS. 1-3.

Step 62 includes committing the first video data and metadata to the blockchain ledger. After the first video data (and associated metadata) is preprocessed, the first video data and metadata are committed to the blockchain ledger to record the edits that have been performed on the first video data (and metadata) by the first computer processor (e.g., gateway 16) according to the preprocessing parameters defined in the configuration file. Step 62, in committing the first video data and metadata to the blockchain ledger after the first video data has been preprocessed, ensures that if additional edits (e.g., manipulations) to the first video data (other than those performed prior to step 62) are later found when examining the first video data, it can determined that those edits/manipulations were not performed by the first computer processor (e.g., gateway 16) or at the time that the first video data was committed to the blockchain ledger.

Step 64 includes publishing the first video data (and associated metadata) to the endpoint, which can be a proxy location and/or unified endpoint hosted by the first computer processor (e.g., gateway 16). The publishing in step 64 can be to/within an asynchronous messaging library, such as ZeroMQ. Further, the proxy location and/or unified endpoint to which the first video data (e.g., scenes 24A-24C) is published can be in wired or wireless communication with the first computer processor (e.g., gateway 16).

Step 66 includes accessing the first video data (e.g., the scene/topic) and associated metadata by the first subscriber (or any number of subscribers). The first subscriber can be a second computer processor or any other type of software and/or hardware. The preprocessed first video data can be edited/preprocessed for a desired use by the first subscriber, who then accesses the first video data (and associated metadata) potentially for further processing depending on the desired output/inference to be determined from the first video data. The first subscriber can be distant (e.g., physically remote) from the location at which the first video data is published such that step 66 can be performed physically and temporarily distant from step 64. For example, the first subscriber can be a second computer processor that is in communication with the endpoint via the internet, with the first video data being published to the endpoint by the first computer processor.

Step 68 includes again committing the first video data and metadata to the blockchain ledger. After the first video data (and metadata) has been transmitted from the first computer processor (e.g., gateway 16) to the first subscriber (e.g., the second computer processor and/or subscribers 26A-26D), the first video data and metadata can be committed to the blockchain ledger to ensure that the first video data and metadata has not been manipulated between the time the first video data was published by the first computer processor and the time the first video data is received by the first subscriber. Manipulation can be identified by comparing the first video data and metadata recorded in the blockchain ledger in step 62 to the first video data and metadata recording in the blockchain ledger in step 68. If the two entries of the first video data (and metadata) are different, then the first video data and metadata can be identified as altered/manipulated. If the two entries are identical, then the first video data and metadata can be identified as having not been altered/manipulated.

Step 70 includes processing the first video data, by the first subscriber (e.g., the second computer processor), to determine at least one output indicative of an inference dependent upon the first video data and/or to alter the first video data. For simplicity, the first video data (and associated metadata) that has been processed in step 70 can be referred to as altered first video data because the first video data can be changed/altered by the processing performed in step 70. Examples of the processing by the first subscriber are described above with regards to FIG. 5. Step 70 can include further editing of the first video data and/or metadata, which may change/alter the first video data as compared to the first video data before step 70 (i.e., altered first video data). Additionally, the processing of the first video data in step 70 can include, for example, applying an AI model to the first video data to determine and record at least one output. In another example, optical character recognition (OCR) is applied to the first video data to determine and record any text that is shown in the first video data. Step 70 can include other processing to extract information/data from the first video data in the form of one or more outputs.

Step 72 includes committing the altered first video data and metadata to the blockchain ledger. After the altered first video data (and associated metadata) is processed by the first subscriber (e.g., the second computer processor), the altered first video data and metadata are committed to the blockchain ledger to record the edits/processing that have been performed on the first video data (and metadata) by the first subscriber (e.g., the second computer processor). Step 72, in committing the altered first video data and metadata to the blockchain ledger after the first video data has been processed, ensures that if additional edits (e.g., manipulations) to the altered first video data (other than those performed prior to step 72) are later identified when examining the altered first video data, it can be determined that those edits/manipulations were not performed by the first subscriber (e.g., the second computer processor).

Step 72 can also include committing any information recorded during step 70 (during the processing by the first subscriber) to the blockchain ledger. This information can include, for example, any information/data created/collected by an AI model (such as the amount of a product that passes by in the first video data) and/or any text collected by OCR. Committing the additional information created/collected/recorded during step 70 provides a record of the information/data that cannot be altered/modified once committed to the blockchain ledger. Such information/data may be used for proof of the particular output determined by the processing, as well as validation and/or authentication of the information and/or inferences derived from the information.

Step 74, which can be performed at any point during method 50, includes examining the streaming video data, the first video data, and/or the altered video data and associated metadata as committed/recorded in the blockchain ledger. Because the video data recorded in the blockchain ledger is not able to be modified/altered, the video data is authentic and used as proof of the state of the video data throughout the collection, preprocessing, publishing, accessing, and processing of that video data. If the video data was manipulated at any point during method 50 (without notice and/or authorization), the manipulated video data would be recorded as is in the blockchain ledger and/or comparable to a previous entry of the video data in the blockchain ledger. Both situations, after step 74 of examining the video data (and associated metadata) in the blockchain ledger, allow for an identification of when and who manipulated the video data without notice and/or authorization. Thus, method 50, with multiple steps that include committing the video data to the blockchain ledger, allows for validation of the authenticity of the video data throughout the collection, preprocessing, publishing, accessing, and processing of the video data.

Step 74 can include comparing the streaming video data (and associated metadata) as committed to the blockchain ledger in step 54 and/or step 58 to the first video data (and associated metadata) as committed to the blockchain ledger in step 62 and/or step 68 and validating that the only difference between the streaming video data and the first video data is the changes made during step 60, which is preprocessing the steaming video data. Additionally, step 74 can include comparing the first video data (and associated metadata) as committed to the blockchain ledger in step 62 and/or step 68 to the altered first video data (and associated metadata) as committed to the blockchain ledger in step 72 and validating that the only difference between the first video data and the altered video data is the changes made during step 70, which is processing the first video data. Moreover, step 74 can compare the streaming video data that was committed to the blockchain ledger to the altered first video data that was committed to the blockchain ledger in a similar fashion to examine the differences and validate that the only difference is the changes made to the streaming video data during step 60 and step 70. If the differences between the video data entries into the blockchain ledger are other than the changes performed during step 60 and 70, it can be determined that the video data was manipulated/altered/modified without notice and/or authorization during method 50. In such a situation, the video data would not be validated as authentic.

Figure 7:
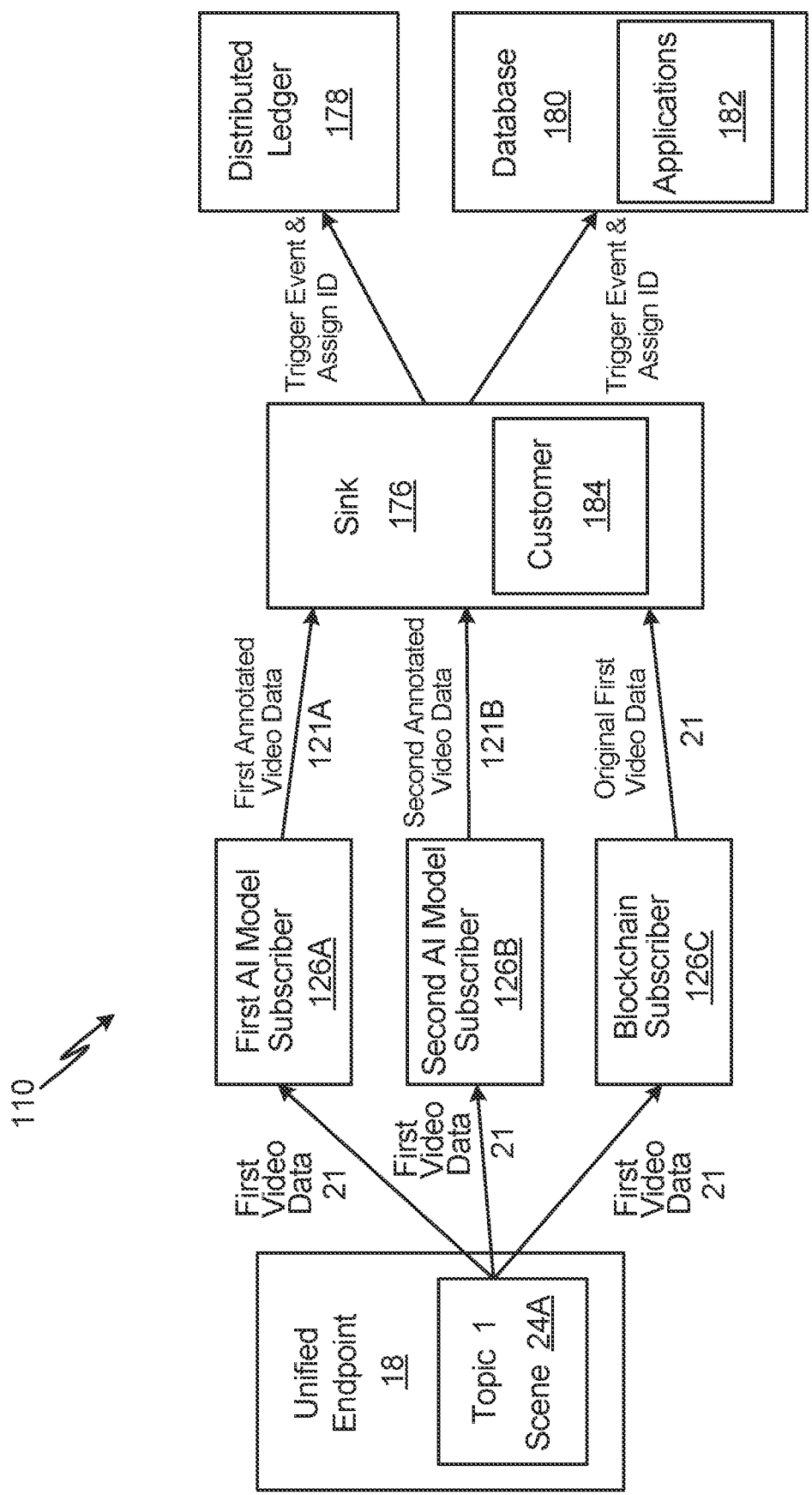
FIG. 7 is a schematic of a system for blockchain recordation and validation of video data.

FIG. 7 shows a system for blockchain recordation (i.e., commitment) and authentication of video data. Unified endpoint 18 provides scene 24A (topic 1) having first video data 21 to blockchain validation system 110 via providing availability of scene 24A via publication at unified endpoint 18 (similar to system 10). To access scene 24A (video data 21), first AI model subscriber 126A, second AI model subscriber 126B, and blockchain subscriber 126C subscribe to topic 1 at unified endpoint 18. Each of first AI model subscriber 126A, second AI model subscriber 126B, and/or blockchain subscriber 126C can be one or multiple computer processors at various locations near or distant from unified endpoint 18 and each other. First AI model subscriber 126A, second AI model subscriber 126B, and/or blockchain subscriber 126C can be in communication with sink 176, distributed ledger 178 (also referred to as blockchain ledger 178), and/or database 180.

First AI model subscriber 126A performs processing on first video data 21 that is similar to (or the same as) AI model 48A, which is one of processing 48 that is performed on first video data 21. Additionally, second AI model subscriber 126B performs processing on first video data 21 that is similar to (or the same as) AI model 48A, but in system 110 first AI model subscriber 126A and second AI model 126B can be analyzing/processing first video data 21 to determine outputs that are indicative of different inferences. The determination of an output that is indicative of an inference can include monitoring, by at least one of AI model subscribers 126A and 126B, video data 21 for the occurrence of the inference and formulating the first output when the inference occurs. Thus, the output is dependent upon the occurrence of an inference.

When an inference is detected/determined, AI model subscribers 126A and/or 126B can formulate the corresponding outputs (e.g., the detection of an inference prompts the formulation of an output). For example, first AI model 126A can be processing first video data 21 to determine an output that is indicative of the amount of a specific product that is viewable in scene 24A (i.e., a first inference), and second AI model 126B can be processing first video data 21 to determine a different output that is indicative of how many people appear in scene 24A over a defined period of time (i.e., a second inference). The outputs by first AI model subscriber 126A and second AI model subscriber 126B can be annotated first video data and metadata (shown in FIG. 7 as first annotated video data 121A and second annotated video data 121B) that includes information detailing when, where, and why the inferences were determined by the AI models. This information can be included by annotating the video data and/or adding information to the metadata associated with the annotated video data.

For example, first annotated video data 121A can show an outlined box overlaid over original video data 21 highlighting a specific product that is viewable in scene 24A as well as a number overlaid over original video data 21 showing a probability that first AI model subscriber 126A has correctly identified the specific product. The metadata associated with first annotated video data 121A can include, in some examples, additional information related to the annotated video data, such as specifying the location on the frame of the video at which the specific product is viewable. Annotated video data 121A and 121B (and associated metadata) can include any other information used by and/or created by AI model subscribers 126A and 126B, respectively.

First AI model subscriber 126A and second AI model subscriber 126B can process video data 21 in parallel (as shown in FIG. 7) where each subscriber 126A and 126B subscribes to topic 1 to access video data 21 and each subscriber 126A and 126B performs processing/analysis on original video data 21 simultaneously to determine the occurrence of first inferences and second interferences associated with first AI model subscriber 126A and second AI model subscriber 126B, respectively. In another embodiment, first AI model subscriber 126A and second AI model subscriber 126B perform processing on video data 21 in series such that first AI model subscriber 126A has access to video data 21 and processes video data 21 first and second AI model subscriber 126B has access to annotated video data 121A and processes annotated video data 121A after it has been processed by first AI model subscriber 126A, thereby outputting the information from both first AI model subscriber 126A and second AI model subscriber 126B as second annotated video data 121B. While shown in FIG. 7 as only having two AI model subscribers 126A and 126B performing processing in parallel, other embodiments of system 110 can include any number of AI model subscribers performing processing in series and/or in parallel.

Blockchain subscriber 126C accesses video data 21 by subscribing to topic 1 (i.e., scene 24A). Blockchain subscriber 126C can be configured to perform no processing of video data 21 and instead can just provide a relay (e.g., location) for original video data 21 for later use in commitment to distributed ledger 178 and database 180 along with first annotated video data 121A and/or second annotated video data 121B. Original video data 21 as accessed by blockchain subscriber 126C may be useful in comparison to first annotated video data 121A (which includes information added by first AI model subscriber 126A) and/or second annotated video data 121B (which includes information added by second AI model subscriber 126B). System 110 can be configured to not include blockchain subscriber 126C. For example, sink 176 could be configured to perform the functions of blockchain subscriber 126C by subscribing to topic 1 at unified endpoint 18. Additionally, blockchain subscriber 126C can be combined with one or more other components of system 110, such as being a part of sink 176.

Sink 176 can include one or more controllers, computer processors, digital storage media, and/or other components that are in communication with first AI model subscriber 126A, second AI model subscriber 126B, and blockchain subscriber 126C. Sink 176 can accept and store first annotated video data 121A (and associated metadata), second annotated video data 121B (and associated metadata), and/or original first video data 21 and commit video data 121A, 121B, and/or 21 (and associated metadata) to distributed ledger 178 and/or database 180 when a trigger event occurs, which can be dependent upon the outputs/inferences determined by first AI model subscriber 126A and/or second AI model subscriber 126B. Alternatively, sink 176 does not need to store video data 121A, 121B, and/or 21 (and associated metadata) and can be a component that, when a trigger event occurs, performs instructions to commit video data 121A, 121B, and/or 21 (and associated metadata) to distributed ledger 178 and/or database 180. Additionally, sink 176 can be a virtual location to which video data 121A, 121B, and 21 is relayed/sent/published until a trigger event prompts commitment to distributed ledger 178 and/or database 180

The event that triggers the commitment of video data 121A, 121B, and/or 21 to distributed ledger 178 and/or database 180 can be any event for which recordation and authentication is desired (e.g., proof of authenticity and/or that AI model subscribers 126A and/or 126B are functioning properly). The trigger event can be an instance (one frame of video data or a duration of time encompassing multiple frames of video data) when AI model subscribers 126A and 126B determine an output indicative of an inference. The inference can be anything of interest to AI model subscribers 126A and/or 126B. Some examples of an inference are as follows: a product that is viewable in video data 21 (i.e., scene 24A), an incorrect product that is viewable in video data 21 (e.g., a product that is not the product of interest), a product that is viewable in video data 21 that is defective, a specified number of products that are viewable in video data 21 simultaneously or over a specified duration of time, any person that is viewable in video data 21, any vehicles that are viewable in video data 21, or anything else that is of interest to AI model subscribers 126A and/or 126B. In another example, video data 21 can show at least a portion of a manufacturing system used to construct a specific product and the inference occurs when the AI model determines that the specific product is incorrectly constructed (i.e., has a defect).

For ease of understanding, each commitment of video data 121A, 121B, and/or 21 (and associated metadata, which can include customer, business, and/or other related data) to distributed ledger 178 and/or database 180 is called an entry. Sink 176 can review video data 121A, 121B, and/or 21 for outputs indicative of inferences that are trigger events, or every inference determined by AI model subscribers 126A and 126B can be a trigger event that results in an entry being committed to blockchain ledger 178 and database 180. Other embodiments/configurations can have first AI model subscriber 126A, second AI model subscriber 126B, and/or blockchain subscriber 126C in communication with one another and configured to instruct one another to commit an entry to distributed ledger 178 and/or database 180 when each determines an output indicative of an inference that is a trigger event. In such a configuration, each subscriber 126A, 126B, and 126C determines when one or multiple subscribers should provide video data to be part of an entry committed to distributed ledger 178 and/or database 180. Further, system 110 can be configured such that the presence/determination of an inference by AI model subscribers 126A and/or 126B automatically triggers the commitment of an entry that encompasses that inference (along with original video data 21) without the need for further instruction from sink 176 or other components.

Each entry to distributed ledger 178 and/or database 180 can include video data from one, two, or all of video data 121A, 121B, and/or 21 (and associated metadata). For example, when first AI model subscriber 126A determines an output that is indicative of an inference that warrants the commitment of an entry, both first annotated video data 121A (from first AI model subscriber 126A) and original video data 21 (from blockchain subscriber 126C) can be committed as an entry to distributed ledger 178 and/or database 180 (without the committing of second annotated video data 121B). In another situation, when first AI model subscriber 126A determines an output that is indicative of an inference that warrants the commitment of an entry, all three of first annotated video data 121A, second annotated video data 121B, and original video data 21 can be committed as an entry to distributed ledger 178 and/or database 180.

Each entry to distributed ledger 178 and/or database 180 can be one frame of specified video data (e.g., the frame/still image of video data that shows the inference determined by first AI model subscriber 126A and/or second IA model subscriber 126B as well as the one frame of original video data 21 of blockchain subscriber 126C) or multiple frames/still images of the video data. For example, if first AI model subscriber 126A determines an output that is indicative of an inference warranting commitment of an entry to distributed ledger 178 and/or database 180, the entry can include ten frames of video data before the frame of interest (i.e., the frame that shows the inference), ten frames of video data after the frame of interest, and the frame of interest. Thus, the entry would include twenty-one frames of first annotated video data 121A. Additionally, the entry could also include those same corresponding twenty-one frames of original video data 21 for comparison to first annotated video data 121A. In such a configuration, with each entry including frames before and after the frame of interest (i.e., the frame showing the inference), it is likely that the inference (and associated metadata) will be captured and committed to distributed ledger 178 and/or database 180 for authenticity.

Other configurations can include entries with more or less frames per entry, and the number of frames can be dependent upon the inference that is determined/discovered by AI model subscribers 126A and 126B. For example, if the inference lasts a duration of time that is shown in forty frames, the entry to the distributed ledger 178 and/or database 180 can be fifty frames (which includes five frames before and five frames after the frames encompassing the inference).

Before being committed to distributed ledger 178 and/or database 180, the entry can be assigned an identification number. The identification number can be saved in a storage media, such as database 180, to enable identification and access to the entry as saved in distributed ledger 178. The identification number should be the same number for the entry if it is committed/saved in multiple locations, and different entries should have different identification numbers than previous entries. Therefore, with each entry having a different identification number (and the number being saved in searchable database 180), each entry is easily identifiable and locatable in distributed ledger 178. The identification number can be assigned by/at sink 176 or by another component of system 110, such as a computer processor.

Distributed ledger 178 can be a blockchain ledger that is public or private. Distributed ledger 178 can be a database with one or multiple storage media that allows for entries (that can include video data 121A, 121B, and/or 21 and associated metadata) to be committed/saved and shared across multiple networks, sites, institutions, geographies, processors, etc. (i.e., nodes). The participant at each node of distributed ledger 178 can access the entries committed/saved/shared across distributed ledger 178 and can own an identical copy of the entry. Any additions (i.e., new entries) to distributed ledger 178 are reflected and copied to all nodes. The nodes communicate to ensure that each entry is identically saved at each node. Thus, manipulation of the entries within distributed ledger 178 is difficult as each entry saved at each node would have to be manipulated without detection by distributed ledger 178.

Sink 176 can include customer 184, which can include a controller, computer processor, digital storage media, customer interface, and/or other components. Customer 184 can have access to all of the data coming to (and accessible by) sink 176, such as first annotated AI video data 121A, second annotated AI video data 121B, and original video data 21 (and associated metadata). For example, the customer interface of customer 184 can be configured to view first annotated video data 121A, second annotated video data 121B, and/or original view data 21 (and associated metadata). Additionally, a node of distributed ledger 178 can be located at and/or under the control of customer 184 such that any information/entries committed to distributed ledger 178 is also accessible by customer 184. Thus, customer 184 can evaluate and/or analyze video data 121A, 121B, and/or 21 and associated metadata to confirm/ensure the inferences are correct. In such a situation, because customer 184 is under the control of a node of distributed ledger 178, customer 184 would have to authorize the commitment of the entry to distributed ledger 178. Therefore, customer 184 can play a role in the confirmation of inferences and the commitment of entries to distributed ledger 178.

Database 180 can include a computer processor, digital storage media, and/or other components that allowed for the organized collection of structured data, such as entries that includes video data 121A, 121B, and/or 21 and associated metadata (and potentially identification numbers for each entry). Database 180 can be modeled in rows and columns in a series of tables to make identifying and accessing the entries and the information associated with the entries (video data and/or metadata) easy and organized, though any type of database usable for storing the information in an organized manner for later retrieval can be utilized. Database 180 can be a separate component, or can be combined with sink 176, blockchain subscriber 126C, and/or other components of system 110. Database 180 is configured to allow access and viewability of each entry without the need to access distributed ledger 178. Thus, a party can look at the entries in database 180 as a preliminary analysis of the entry and then refer to the entry in distributed ledger 178 for an authenticated version of the entry. Because the entry can have the same identification number in database 180 as in distributed ledger 178, the entry in distributed ledger 178 is easy to find as it corresponds to the entry in database 180. Additionally, database 180 can include other information for identifying the entry in distributed ledger 178, such as the date and time that the entry was committed to distributed ledger 178. Further, database 180 can include or function in association with applications 182, which can be configured to sort, analyze, edit, process, and/or otherwise examine entries in database 180 for any desired purpose.

The entries committed to distributed ledger 178 do not need verification from any other system, and can be stand-alone data that does not need information or reference to any other system. Thus, if the entries need to be accessed and analyzed long after being committed to distributed ledger 178, no further information or context is needed by the analyzing party to fully understand and review video data 121A, 121B, and/or 21 (and associated metadata). The entry in distributed edger 178, even when accessed long after the entry is committed, is credible and authentic due to the characteristics of distributed ledger 178 and the commitment process of the entry (which includes video data 121A, 121B, and 21 (and associated metadata)) by system 110. Thus, the authenticity of first annotated video data 121A, second annotated video data 121B, and/or original video data 21 can be confirmed by reviewing the entry of that video data in distributed ledger 178.

System 110 can include other components and capabilities not expressly disclosed herein. For example, system 110 can have an audit system that reports data to customer 184 continuously or periodically. In one example, audit system can report to customer 184 (or other interested parties) a summary of inferences determined by AI model subscribers 126A and 126B and/or entries committed to distributed ledger 178. In another example, audit system can report a list of the entries committed to distributed ledger 178 along with the identification number for each entry.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of committing video data and associated metadata to a blockchain ledger, the method comprising:
preprocessing the video data, by a first computer processor, according to preprocessing parameters defined within a runtime configuration file, wherein the video data is preprocessed to edit the video data to be suitable for use by a first artificial intelligence model;
accessing the preprocessed video data and associated metadata by the first artificial intelligence model, the first artificial intelligence model being configured to determine a first output that is indicative of a first inference dependent upon the preprocessed video data;
formulating first annotated video data and associated metadata by the first artificial intelligence model that includes the first output indicative of the first inference;
accessing the preprocessed video data and associated metadata by a blockchain subscriber independent from the first artificial intelligence model;
in response to a determination by the first artificial intelligence model that the first inference has occurred so as to prompt the formulation of the first output, committing a first entry to the blockchain ledger that includes the first annotated video data, metadata associated with the first annotated video data, the preprocessed video data, and metadata associated with the preprocessed video data, wherein the blockchain ledge includes multiple nodes each having digital storage media and the entry is committed for storage at each node;
committing the first entry to a first node of the multiple nodes of the blockchain ledger, the first node being located at a customer terminal; and
accessing at least one of the first annotated video data, metadata associated with the first annotated video data, the preprocessed video data, and the metadata associated with the preprocessed video data at the customer terminal.

2. The method of claim 1, further comprising:
assigning an identification number to the first entry.

3. The method of claim 2, further comprising:
accessing the first entry in the blockchain ledger using the identification number.

4. The method of claim 3, further comprising:
comparing the first annotated video data and metadata associated with the first annotated video data to the video data and metadata associated with the video data of the first entry in the blockchain ledger to confirm an authenticity of the first annotated video data and metadata associated with the first annotated video data.

5. The method of claim 1, further comprising:
in response to the determination by the first artificial intelligence model that the first inference has occurred so as to prompt the formulation of the first output, saving the first entry to a database that includes digital storage media.

6. The method of claim 5, further comprising:
assigning an identification number to the first entry that is both committed to the blockchain ledger and saved to the database.

7. The method of claim 1, wherein the step of accessing the preprocessed video data and associated metadata by the first artificial intelligence model with the first artificial intelligence model being configured to determine a first output that is indicative of a first inference dependent upon the video data comprises:
monitoring, by the first artificial intelligence model, the preprocessed video data for the occurrence of the first inference; and
formulating the first output in response to an occurrence of the first inference.

8. The method of claim 1, wherein the video data shows at least a portion of a manufacturing system for constructing a product and the first inference occurs in response to a determination by the first artificial intelligence model that the product is incorrectly constructed.

9. The method of claim 1, further comprising:
accessing the preprocessed video data and associated metadata by a second artificial intelligence model, the second artificial intelligence model being configured to determine a second output that is indicative of a second inference dependent upon the preprocessed video data;
formulating second annotated video data and associated metadata by the second artificial intelligence model including the second output indicative of the second inference; and
in response to a determination by the second artificial intelligence model that the second inference has occurred so as to prompt the formulation of the second output, committing a second entry to the blockchain ledger that includes the second annotated video data, metadata associated with the second annotated video data, the preprocessed video data, and the metadata associated with the preprocessed video data.

10. A system for authenticating video data and metadata associated with the video data, the system comprising:
a blockchain ledger;
a gateway, which includes a first computer processor, that is configured to preprocess the video data according to preprocessing parameters defined within a runtime configuration file to edit the video data to be suitable for use by a first artificial intelligence model;

the first artificial intelligence model configured to:
- access the preprocessed video data and associated metadata,
- determine a first output that is indicative of a first inference dependent upon the preprocessed video data, and
- formulate first annotated video data and associated metadata that includes the first output indicative of the first inference;

a blockchain subscriber, which is executed by a second computer processor, that is independent from the first artificial intelligence model and is configured to access the preprocessed video data and associated metadata;

a sink in communication with the first artificial intelligence model and the blockchain subscriber, the sink being configured to, in response to a determination by the first artificial intelligence model that the first inference has occurred so as to prompt the formulation of the first output, commit a first entry to the blockchain ledger that includes the first annotated video data, metadata associated with the first annotated video data, the preprocessed video data, and the metadata associated with the preprocessed video data; and a second artificial intelligence model configured to access the video data and associated metadata, determine a second output that is indicative of a second inference dependent upon the video data, and formulate second annotated video data and associated metadata that includes the second output indicative of the second inference, wherein the sink is in communication with the second artificial intelligence model and configured to, in response to a determination by the second artificial intelligence model that the second inference has occurred so as to prompt formulation of the second output, commit a second entry to the blockchain ledger that includes the second annotated video data, metadata associated with the second annotated video data, the preprocessed video data, and metadata associated with the preprocessed video data.

11. The system of claim 10, further comprising:
a database having digital storage media,
wherein the sink is configured to, in response to the determination by the first artificial intelligence model that the first inference has occurred so as to prompt the formulation of the first output, save the first entry to the database.

12. The system of claim 11, further comprising:
a third computer processor in communication with the sink, the third computer processor being configured to assign an identification number to the first entry committed to the blockchain ledger and saved to the database.

13. The system of claim 11, wherein the sink includes the third computer processor such that the sink assigns the identification number to the first entry.

14. The system of claim 11, further comprising:
a fourth computer processor in communication with the database and configured to access the first entry in the database to view at least one of the first annotated video data, metadata associated with the first annotated video data, the preprocessed video data, and the metadata associated with the preprocessed video data.

15. The system of claim 10, further comprising:
a customer terminal able to access the first annotated video data and metadata associated with the first annotated video data.

16. The system of claim 10, wherein the video data shows at least a portion of a manufacturing system for constructing a product and the first inference occurs in response to a determination by the first artificial intelligence model that the product is incorrectly constructed.

17. The system of claim 10, wherein the first artificial intelligence model and the second artificial intelligence model access and analyze the video data simultaneously to determine the occurrence of the first inference and the second inference, respectively.

18. A method of committing video data and associated metadata to a blockchain ledger, the method comprising:
preprocessing the video data, by a first computer processor, according to preprocessing parameters defined within a runtime configuration file, wherein the video data is preprocessed to edit the video data to be suitable for use by a first artificial intelligence model;
accessing the preprocessed video data and associated metadata by the first artificial intelligence model, the first artificial intelligence model being configured to determine a first output that is indicative of a first inference dependent upon the preprocessed video data;
formulating first annotated video data and associated metadata by the first artificial intelligence model that includes the first output indicative of the first inference;
accessing the preprocessed video data and associated metadata by a blockchain subscriber independent from the first artificial intelligence model;
in response to a determination by the first artificial intelligence model that the first inference has occurred so as to prompt the formulation of the first output, committing a first entry to the blockchain ledger that includes the first annotated video data, metadata associated with the first annotated video data, the preprocessed video data, and metadata associated with the preprocessed video data;
assigning an identification number to the first entry;
accessing the first entry in the blockchain ledge using the identification number; and
comparing the first annotated video data and metadata associated with the first annotated video data to the video data and metadata associated with the video data of the first entry in the blockchain ledge to confirm an authenticity of the first annotated video data and metadata associated with the first annotated video data.

19. The method of claim 18, wherein the step of accessing the preprocessed video data and associated metadata by the first artificial intelligence model with the first artificial intelligence model being configured to determine a first output that is indicative of a first inference dependent upon the video data comprises:
monitoring, by the first artificial intelligence model, the preprocessed video data for the occurrence of the first inference; and
formulating the first output in response to an occurrence of the first inference.

20. The method of claim 18, further comprising:
in response to the determination by the first artificial intelligence model that the first inference has occurred so as to prompt the formulation of the first output, saving the first entry to a database that includes digital storage media.

* * * * *